United States Patent
Laurens et al.

(10) Patent No.: US 8,230,546 B2
(45) Date of Patent: Jul. 31, 2012

(54) SUPPORT FOR MOUNTING A WINDSCREEN WIPER BLADE ON A DRIVE ARM MADE OF BENT SHEET

(75) Inventors: Romain Laurens, Clermont-Ferrand (FR); Frederic Baud, Clermont-Ferrand (FR)

(73) Assignee: Valeo Systèmes d'Essuyage, La Verrière (FR)

( * ) Notice: Subject to any disclaimer, the term of this patent is extended or adjusted under 35 U.S.C. 154(b) by 962 days.

(21) Appl. No.: 12/095,657

(22) PCT Filed: Nov. 27, 2006

(86) PCT No.: PCT/EP2006/068959
§ 371 (c)(1),
(2), (4) Date: Jun. 19, 2008

(87) PCT Pub. No.: WO2007/063051
PCT Pub. Date: Jun. 7, 2007

(65) Prior Publication Data
US 2010/0218328 A1    Sep. 2, 2010

(30) Foreign Application Priority Data
Nov. 30, 2005   (FR) .................................. 05 12147

(51) Int. Cl.
*B60S 1/40* (2006.01)
(52) U.S. Cl. ............. 15/250.32; 15/250.43; 15/250.201; 15/250.361
(58) Field of Classification Search ............... 15/250.43, 15/250.201, 250.361, 250.351, 250.32
See application file for complete search history.

(56) References Cited

U.S. PATENT DOCUMENTS

| 2,634,446 | A | * | 4/1953 | Mackie et al. | ........... 15/250.451 |
| 3,390,415 | A | * | 7/1968 | Scinta | ........... 15/250.43 |
| 6,634,055 | B1 | * | 10/2003 | De Block | ........... 15/250.32 |
| 2003/0182753 | A1 | * | 10/2003 | Baseotto et al. | ........... 15/250.32 |
| 2004/0019997 | A1 | * | 2/2004 | Baseotto et al. | ........... 15/250.32 |
| 2006/0248675 | A1 | * | 11/2006 | Vacher et al. | ........... 15/250.32 |

FOREIGN PATENT DOCUMENTS

| DE | 196 41 042 A1 | 4/1998 |
| EP | 1 484 224 A | 12/2004 |
| FR | 2847221 A1 * | 11/2003 |
| GB | 678 149 | 8/1952 |
| WO | 98/15438 | 4/1998 |

* cited by examiner

OTHER PUBLICATIONS

Translation of FR2847221 including five pages from http://translationgateway.epo.org/emptp/gw/?ACTION=description-retrival&OPS=ops.epo . . . .* International Search Report issued in PCT/EP2006/068959 mailed on Apr. 17, 2007, with translation, 4 pages.

*Primary Examiner* — Gary Graham
*Assistant Examiner* — Michael Jennings
(74) *Attorney, Agent, or Firm* — Osha • Liang LLP

(57) ABSTRACT

A support for mounting a windscreen wiper blade includes at least two opposing lower lateral claws arranged transversally on either side of the support, each of the claws being able to collaborate with an associated part of a backbone of the blade for attaching the support on the blade, and an upper part on which a connector can be jointedly mounted about a transversal joint axis. The upper part includes at least one elastically deformable portion which is able to deform when the support is mounted and attached to the blade in order to allow a globally transverse movement of the lateral claws, one relative to the other between at least a parted position in which there is no collaboration with the associated part of the backbone, and a close up position in which there is a collaboration with the associated part of the backbone.

9 Claims, 2 Drawing Sheets

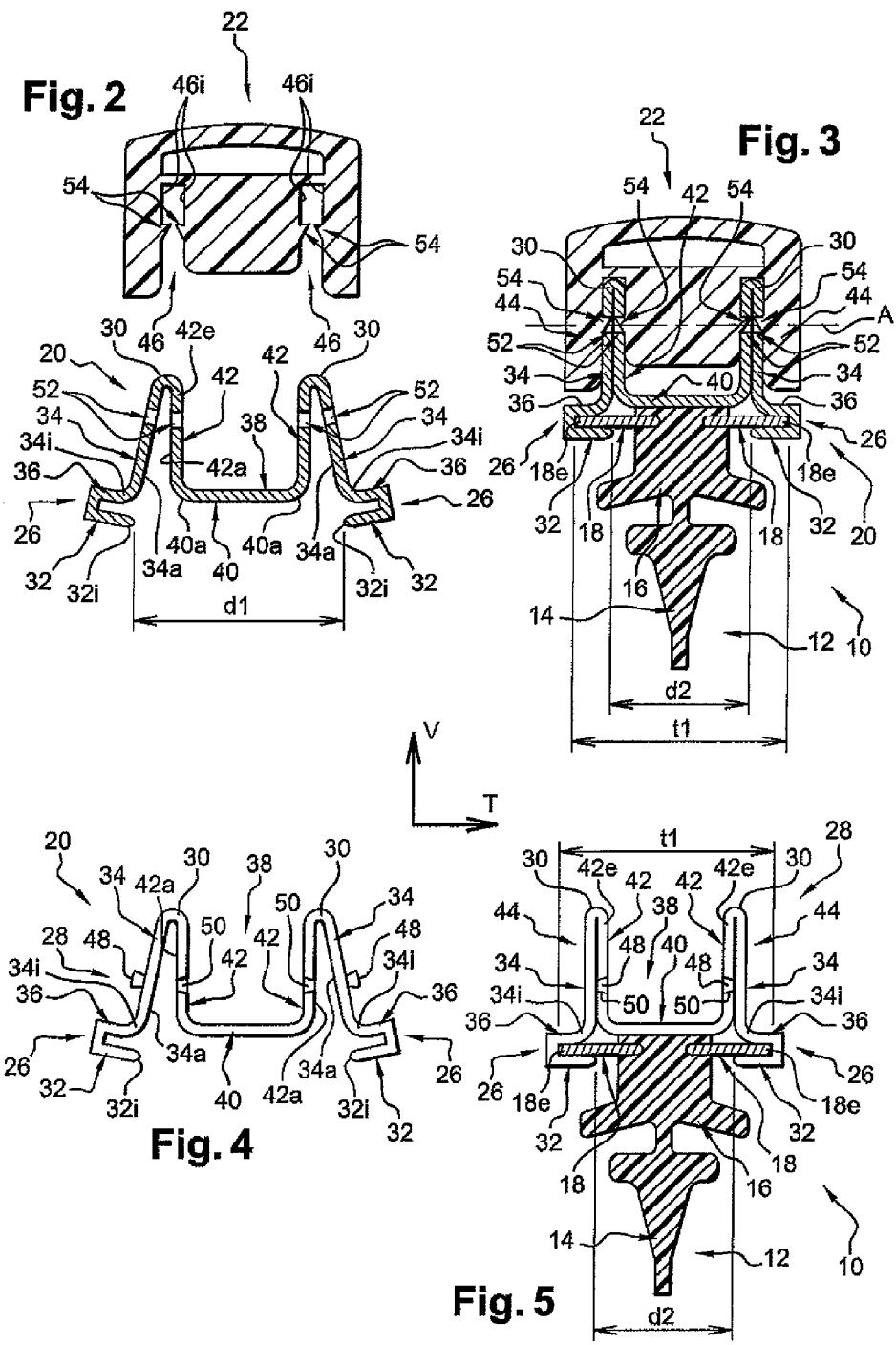

SUPPORT FOR MOUNTING A WINDSCREEN WIPER BLADE ON A DRIVE ARM MADE OF BENT SHEET

The invention provides a support for mounting a windscreen wiper blade on which a connector is mounted for joint-mounting the blade with respect to a driving arm, which is made in one piece in a folded sheet.

The invention more particularly provides a support for mounting a windscreen wiper blade directed mainly longitudinally on an arm that drives the blade, which is able to be fastened on the blade and on which the driving arm is able to be jointedly mounted through a joint-mounting connector, the mounting support being made in a single piece by cutting and bending a metal sheet and comprising at least two opposing lower lateral claws which are transversely arranged on either side of the support and each of which is able to collaborate with an associated part e of a backbone of the blade for fastening the support on the blade and an upper part on which the connector is able to be jointedly mounted about a joint transversal axis A.

The document WO-A-98/15438 discloses such a mounting support made as a single piece in a folded sheet which includes lower lateral lugs which are able to be folded under a backbone stiffening the blade in order to form fixing claws for the blade mounting support.

According to this document, the folding of the claws is performed during the mounting of the support on the blade.

However, the lower lugs have reduced dimensions and the space available for allowing the folding of the lower lugs is reduced too, more particularly under the backbone As a consequence, the mounting of such a support of a windscreen wiper blade requests the installation of a particularly complex structure, which increases the total costs of such a windscreen wiper blade.

Besides, the efforts used for the folding of the lower lugs are particularly important, which might damage at least partially the windscreen wiper blade.

The object of the invention is to provide a mounting support, whose assembling on the windscreen wiper blade does not include a step of folding, by elastic deformation, of a part of the mounting support.

For this purpose, the invention provides a mounting support of the previously described type, characterised in that the upper part comprises at least an elastically deformable portion which is able to deform during the mounting and the fastening of the mounting support on the blade to allow a globally transversal motion of the lateral claws one relative to another, between a close up position for attaching the support, in which each lateral claw collaborates with the part e of the associated backbone, and at least a parted position in which at least one claw does not collaborate with the part e of the associated backbone, in order to allow the mounting of the support on the blade.

According to other characteristics of the invention:
- the upper part includes two vertical longitudinal lateral wings, wherein the lower end i of each wing is connected to a lateral claw, and in that upper ends of both wings are connected to said at least one elastically deformable portion;
- the upper part includes an intermediate portion transversely arranged between both lateral wings, and in that each lateral wing is connected to the intermediate portion through an associated elastically deformable portion;
- the intermediate portion includes a horizontal bottom directed mainly longitudinally, which is able to rest on an upper face of the blade and two intermediate wings, each of which extends vertically upwards from a longitudinal edge a of the transversal end of the bottom, and in that the upper longitudinal edge of each intermediate wing is connected to the upper longitudinal edge of an associated lateral wing through the associated elastically deformable portion;
- each lateral wing and the associated intermediate wing are transversely joined one against the other at the level of their opposing vertical longitudinal faces a, a by forming a vertical ridge when the lateral claws are in a fastening close up position and in that, when the lateral claws are in a parted position, said lateral wing and said associated intermediate wing are transversally parted from each other;
- both lateral wings are transversely joined one against the other at the level of their opposing vertical longitudinal faces a, forming a vertical ridge, when the lateral claws are in a fastening close up position and in that, when the natural claws are in a parted position, the lateral wings are transversely parted from each other;
- each ridge includes means for blocking the wings in the position joined one against the other;
- the blocking means include a finger which is integral with the wing, and which is received in a matching recess of the associated wing;
- each ridge is able to be received without any transverse appearance in a matching recess of the connector erected mainly vertically and longitudinally when the connector is mounted on the joint support;
- each wing on the support includes an orifice coaxial with the joint transversal axis A, which is able to receive an associated internal transversal tab which protrudes with respect to an internal vertical longitudinal face of the associated recess in order to make the mounting and joint around the transversal axis of the connector on the support.

Other characteristics and advantages of the invention will appear upon reading the following detailed description for the understanding of which reference will be made to the appended Figures, among which:

FIG. 2 is a cross-sectional view along a transversal vertical plan of the mounting support and the connector shown in FIG. 1, prior to the fastening of the support on the windscreen wiper blade and prior to the mounting of the joint connector on the support;

FIG. 3 is a cross-sectional view identical to that of FIG. 2, in which the support is in a position fixed on the windscreen wiper blade, and in which the connector is in a position mounted on the mounting support;

FIGS. 5 and 4 are front views of the mounting support according to an alternative embodiment of the invention, in which the mounting support includes locking fingers.

Figure 1:
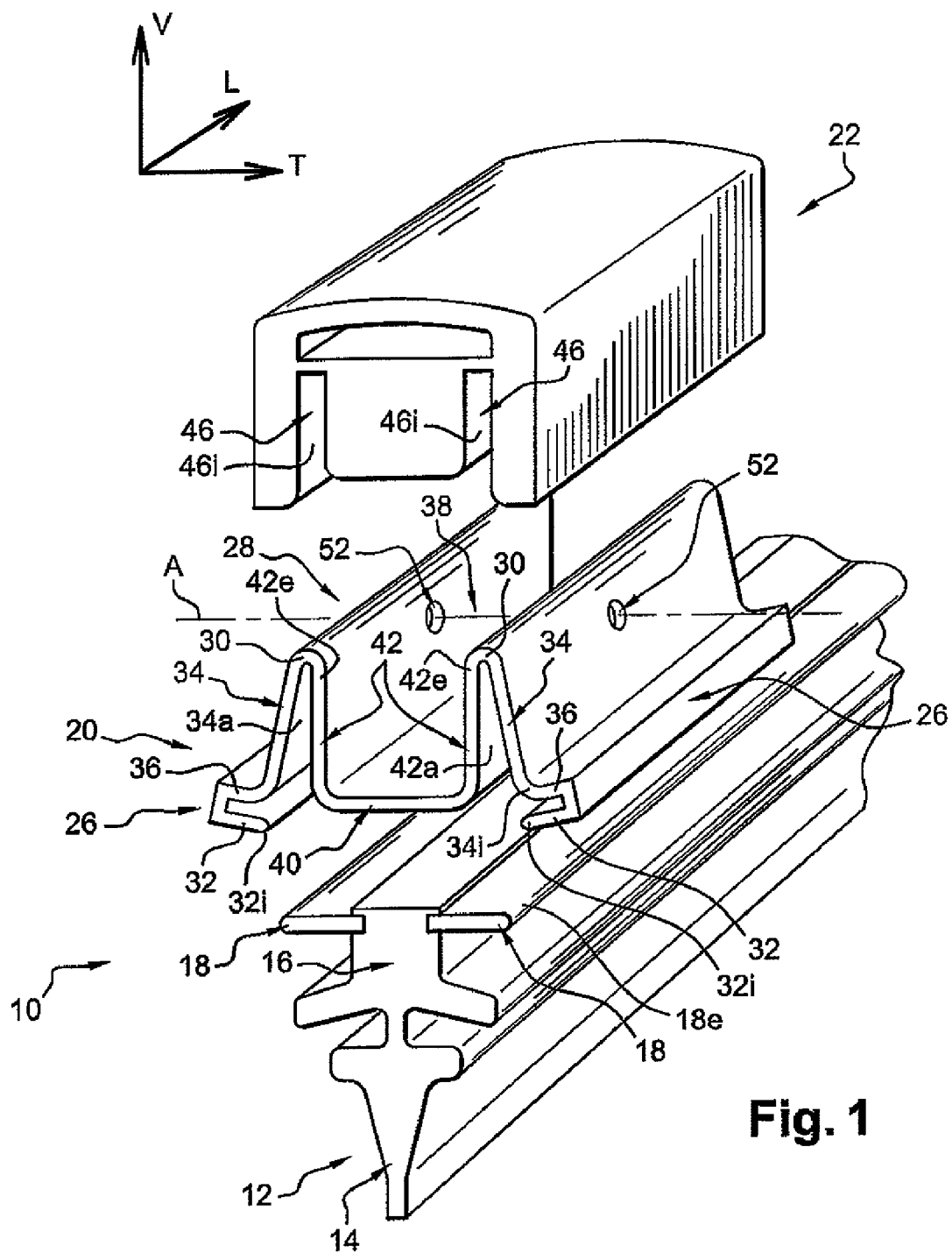
FIG. 1 is a schematic perspective representation of a mounting support according to the invention, which is fastened on a windscreen wiper blade of the "flat blade" type, and on which a connector integral with a driving arm is able to be mounted.

For describing the invention, the vertical, longitudinal and transversal orientations will be non-limitatively used according to the V, L, T system as indicated in the Figures.

In the following description, identical, similar or analogous elements will be designated by the same reference number.

FIG. 1 shows a windscreen wiper blade 10 of the "flat blade" type, which includes a wiping blade 12 extending longitudinally, a rubber blade 14 intended to rub the window to be wiped and in the upper part thereof, a heel 16.

The windscreen wiper blade 10 also includes stiffening backbones 18, each of which is received in a matching groove provided in a lateral edge of the heel 16.

The backbones 18 are designed so as to provide the stiffening of the windscreen wiper blade 10, thus making it possible to distribute the pressing stress of the wiping blade 12 against the window to be wiped, on the whole length thereof.

A mounting support 20 is mounted on the blade 10 and it is longitudinally arranged, globally in the middle of the blade 10, while overlapping the heel 16 and the backbone 18 of the blade 10.

The mounting support 20 is further able to receive a joint-mounting connector 22, about a transversal axis A, an arm 24 driving the blade 10 in an alternate wiping motion on the window to be wiped.

The mounting support 20 consists of a sheet metal plate which has been cut and folded, so that the mounting support 20 consists of an element directed mainly longitudinally, including, in its lower part, lateral claws 26 which are arranged transversely on either side of the blade 10.

In this case, the mounting support 20 includes 2 lateral claws 26 opposing each other, each of which extends longitudinally globally of the whole length of the mounting support 20.

However, it should be understood that the invention is not limited to this embodiment, and that the mounting support 20 can include a greater number of lateral claws 26 which are arranged on either side of the support 20, with the length of each claw 26 being then smaller than the length of the support 20.

Each claw 26 is able to collaborate with a backbone 18 of the blade 4 for fastening the support 20 on the blade 10. For this purpose, each claw 26 defines a longitudinal recess transversally open towards the other claw 26, and in which an external transversal portion 18e of an associated backbone 18 is received.

The mounting support 20 also includes an upper part 28 which extends above the upper heel 16 of the blade 10 and on which the connector 22 is jointedly mounted about the joint transversal axis A.

According to the invention, the upper part 28 of the mounting support 20 includes at least a portion 30 which is elastically deformable to allow, upon the fastening of the mounting support 20 on the windscreen wiper blade 10, a transversal motion of the lateral claws one related to the other, between a parted position shown in FIGS. 1 and 2, towards a fastening close up position shown in FIG. 3.

As can be seen in greater details in FIG. 2, when the claws 26 are in parted position, the transversal distance "d1" between the longitudinal edges of the free internal transversal end 32i of the lower branches 32 of the lower claws 26 is globally equal to the transversal distance "t1" (FIG. 3) between the longitudinal edges of the external parts 18e of both backbones 18.

The space between the free edges 32i of the lower branches 32 thus makes it possible to position the mounting support 20 on the blade 10, so that the external part 18e of each backbone 18 is transversally positioned opposite the longitudinal recess defined by the associated claw 26.

As can be seen in FIG. 3, when the claws 26 are in a fastening close up position, the distance "d2" between the longitudinal edges 32i of the free end of the lower branches 32 of two opposing lateral claws 36 is smaller than the distance "d1" previously described.

In this transversal position of the claws 26 one relative to the other, each backbone 18 is received without any transversal clearance in the recess defined by the associated lateral claw 26.

To allow the relative motion of the lateral claws 26 along a globally transversal motion, the upper part of the mounting support 20 includes two vertical longitudinal wings 34, whose longitudinal edge of the lower end 34i of each lateral wing 34 is connected to the upper branch 36 of each claw 26, which is transversely arranged on the same side of the blade 10.

In this case, the upper part 28 of the mounting support 20 includes an intermediate portion 38 directed mainly longitudinally and the section of which along a transversal vertical plane is in the shape of a "U". Such intermediate portion 38 is transversally arranged between the two lateral wings 34.

The intermediate portion 38 includes a horizontal lower bottom 40 which is able to rest on an upper face of the heel 16 of the wiping blade 12 and two intermediate wings 42, each of which extends vertically upwards from a longitudinal edge of a transversal end 40a of the bottom 40.

According to the invention, the longitudinal edge of the upper end 42e of each lateral wing 42 is connected to the longitudinal edge of the upper end of the associated intermediate wing 42 through an elastically deformable portion 30.

Consequently, a lateral wing 34 is connected to the intermediate portion 38 through an associated elastically deformable portion 30.

As can be seen in FIG. 2, when the lateral claws 26 are in the parted position, to allow the mounting of the mounting support 20 on the blade 10, each lateral wing 34 is transversally positioned at a set distance from the associated intermediate wing 42, i.e. their vertical longitudinal opposing faces 34a, 42a are distant from each other.

On the contrary, as shown in FIG. 3, when the lateral claws 26 are in the mounting close up position, each lateral wing 34 and the associated intermediate wing 42 are transversely joined one against the other at the level of their vertical longitudinal opposing faces 34a, 42a, thus forming a ridge 44 directed mainly longitudinally and vertically which extends upwards from the bottom 40 of the intermediate portion 38.

According to another aspect of the invention, each ridge 44 of the support 20 thus formed by a lateral wing 32 and by the intermediate wing 42 associated is able to be received in a longitudinal vertical recess 46 of the connector 22, which opens vertically downwards at the level of a lower face of the connector 22.

Each recess 46 of the connector 22 has dimensions globally matching those of the associated ridge 44, so that each vertical ridge 44 is received without any transverse clearance in the associated recess 44 when the connector 22 is in the mounted position on the mounting support 20.

Thus, when the connector 22 is in the position mounted on the support 20, each lateral wing 34 of the mounting support 20 cannot move away transversely from the associated intermediate wing 42.

Consequently, the lateral claws 26 of the mounting support 20 cannot move transversely from their mounting close up positions shown in FIG. 3, towards their parted positions shown in FIG. 2. An accidental separation of the mounting support 20 from the blade 10 thus cannot occur.

The connector 22 thus fulfils the function of locking the mounting support 20 in position on the blade 10.

According to a preferred embodiment, prior to being mounted on the blade 10, the mounting support 20 is naturally represented in the form, represented in FIG. 2, i.e. the lateral claws are in the transversely parted position, the elastically deformable portions 30 thus elastically returning the claws 26 to the parted position.

Besides, when the lateral claws 26 are in the close up position for mounting the mounting support 20 on the blade, the elastically deformable portions 30 always exert the same return stress which tends to transversely part the lateral claws 26.

FIGS. 4 and 5 show an alternative embodiment of the mounting support 20 according to the invention, in which the upper part 28 of the mounting support 20 includes means for blocking the lateral wings 34 in a position joined against the intermediate wings 42 of the intermediate portion 38.

In this case, the blocking means include a finger 48 directed mainly transversely, which is integral with each lateral wing 34 and which is able to be received in a matching recess 50 provided in the intermediate wing 42 associated with the lateral wings 34.

In addition, the form of each finger 48 and of the associated recess 50 is determined so as to prevent any sliding of the finger 48 into the associated recess 50, in the transversal direction.

According to another aspect of the fingers 48, these are made so that they can extend at the level of the external vertical longitudinal face 34e of the associated lateral wing, and each finger 48 is able to be elastically deformed before being introduced into the associated recess 50.

According to the embodiment of the invention shown in the Figures, the upper part 28 of the support 20 includes two ridges distributed globally symmetrically with respect to a middle vertical longitudinal plane of the mounting support 20.

However, it should be understood that the invention is not limited to this embodiment of the mounting support 20.

For example, according to another embodiment of the invention, the upper part 28 of the support for mounting 20 includes only one ridge 44 which is thus formed by both lateral wings 34 only.

Consequently, both lateral wings 34 are joined transversely one against the other, at the level of their opposing vertical longitudinal face 34a, when the lateral claws 26 are in the close up mounting position and when the lateral claws 26 are in the parted position, the opposing vertical longitudinal faces of both lateral wings 34 are distant from one another.

The connector 22 then includes one recess 46 which is associated with the single ridge 44 of the upper part 28.

Finally, when the upper part 28 includes means for blocking the lateral wings 34 in the transversely joined position, one against the other, a first lateral wing 34 bears the finger 48 and the other lateral wing 34 bears the associated recess 50.

As mentioned hereabove, the connector is able to be jointedly mounted on the support 20 about the transversal axis A.

The mounting support 20 includes, for this purpose, a joint circular orifice 52 coaxial with the transversal axis A which is provided in each lateral wing 34 and in each intermediate wing 42.

According to a preferred embodiment of the invention as shown in FIGS. 2 and 3, the connector 22 includes an internal tab 54 which protrudes transversally with respect to each internal vertical longitudinal face 46i of each recess 46 and which is able to be received in an associated orifice 52 of the lateral wing 34 or an intermediate wing 42.

Each tab 54 has a globally circular shape matching that of the associated orifice 52 and coaxial with the transversal axis A, so that the tabs 54 make it possible to provide the jointing of the connector 22 with respect to the support 20 about the axis A, and so that they make it possible to longitudinally and transversally block the connector 22 in the position mounted on the support 20.

The invention claimed is:

1. A support for mounting a windscreen wiper blade directed mainly longitudinally on an arm that drives the blade, and configured to be attached on the blade, on which support the driving arm is able to be jointedly mounted by means of a joint-mounting connector, the support comprising:
    at least two opposing lower lateral claws arranged transversally on either side of the support each of the claws being able to collaborate with an associated part of a backbone of the blade for attaching the support on the blade; and
    an upper part on which the connector can be jointedly mounted about a transversal joint axis, the upper part comprising:
       at least one elastically deformable portion that deforms when the support is mounted and attached to the blade, in order to allow a globally transverse movement of the lateral claws, one relative to the other between at least a parted position in which at least one claw does not collaborate with the associated part of the backbone in order to allow the mounting of the support on the blade, and a close up position for attaching the support in which each lateral claw collaborates with the part of the associated backbone;
       two lateral vertical longitudinal wings, a lower end of each wing being connected to a lateral claw, and an upper end of each wing being connected to said at least one elastically deformable portion; and
       an intermediate portion transversally arranged between the two lateral vertical longitudinal wings,
    wherein each lateral vertical longitudinal wing is connected to the intermediate portion through the at least one elastically deformable portion,
    wherein the intermediate portion comprises a mainly longitudinally directed horizontal bottom which is able to rest on an upper face of the blade and two intermediate wings, each of which extends vertically upwards from a transversal and longitudinal edge of the horizontal bottom,
    wherein a longitudinal edge of each intermediate wing is connected to an upper longitudinal edge of a corresponding lateral vertical longitudinal wing through the at least one elastically deformable portion,
    wherein the support is made as a single piece by cutting and bending a metal sheet.

2. The support according to claim 1, wherein each lateral wing and the associated intermediate wing are transversely joined one against the other at the level of opposing vertical longitudinal faces thereof, while forming a vertical ridge when the lateral claws are in the attaching close up position, and when the lateral claws are in the parted position, said lateral wing and said associated intermediate wing are transversely parted one relative to the other.

3. The support according to claim 2, wherein each ridge comprises means for blocking said wings in a position where they are joined one against the other.

4. The support according to claim 3, wherein the blocking means comprises a finger which is integral with a wing and which is received in a matching recess of the associated wing.

5. The support according to claim 1, wherein both lateral wings are transversally joined one against the other at the level of vertical opposing vertical longitudinal faces thereof, forming a vertical ridge when the lateral claws are in the attaching close up position, and when the lateral claws are in a parted position, the lateral wings are transversally parted one relative to the other.

6. The support according to claim 5, wherein each ridge comprises means for blocking said wings in a position where they are joined one against the other.

7. The support according to claim 6, wherein the blocking means comprises a finger which is integral with a wing and which is received in a matching recess of the associated wing.

8. A support for mounting a windscreen wiper blade directed mainly longitudinally on an arm that drives the blade, and configured to be attached on the blade, on which support the driving arm is able to be jointedly mounted by means of a joint-mounting connector, the support comprising:

at least two opposing lower lateral claws arranged transversally on either side of the support, each of the claws being able to collaborate with an associated part of a backbone of the blade for attaching the support on the blade; and an upper part on which the connector can be jointedly mounted about a transversal joint axis, the upper part comprising:

at least one elastically deformable portion that deforms when the support is mounted and attached to the blade, in order to allow a globally transverse movement of the lateral claws, one relative to the other between at least a parted position in which at least one claw does not collaborate with the associated part of the backbone in order to allow the mounting of the support on the blade, and a close up position for attaching the support in which each lateral claw collaborates with the part of the associated backbone; and two lateral vertical longitudinal wings, a lower end of each wing being connected to a lateral claw, and an upper end of each wing being connected to said at least one elastically deformable portion, wherein the support is made as a single piece by cutting and bending a metal sheet, and wherein both lateral vertical longitudinal wings are transversally joined one against the other at the level of vertical opposing vertical longitudinal faces thereof, forming a vertical ridge when the lateral claws are in the attaching close up position, and when the lateral claws are in a parted position, the lateral vertical longitudinal wings are transversally parted one relative to the other, and wherein each vertical ridge is able to be received without any transversal clearance in a matching recess of the connector in a vertical longitudinal main direction when the connector is mounted on the joint support.

9. The support according to claim 8, wherein each wing of the support comprises an orifice coaxial to the joint transversal axis, the orifice being able to receive an associated internal transversal tab which protrudes with respect to an internal vertical longitudinal face of the associated recess, to carry out the jointed mounting about the transversal axis of the connector on the support.

* * * * *